(12) United States Patent
Simmons et al.

(10) Patent No.: US 6,641,642 B2
(45) Date of Patent: Nov. 4, 2003

(54) HIGH TEMPERATURE PRESSURE OXIDATION OF ORES AND ORE CONCENTRATES CONTAINING SILVER USING CONTROLLED PRECIPITATION OF SULFATE SPECIES

(75) Inventors: Gary L. Simmons, Castle Rock, CO (US); John C. Gathje, Longmont, CO (US)

(73) Assignee: Newmont USA Limited, Denver, CO (US)

( * ) Notice: Subject to any disclaimer, the term of this patent is extended or adjusted under 35 U.S.C. 154(b) by 119 days.

(21) Appl. No.: 10/032,118

(22) Filed: Dec. 21, 2001

(65) Prior Publication Data

US 2003/0136225 A1 Jul. 24, 2003

(51) Int. Cl.⁷ .................................. C22B 3/08
(52) U.S. Cl. .................. 75/743; 75/744; 423/27; 423/29
(58) Field of Search .............. 75/743, 744; 423/27, 423/29

(56) References Cited

U.S. PATENT DOCUMENTS

| | | | |
|---|---|---|---|
| 3,891,522 A | * 6/1975 | McKay et al. | 75/373 |
| 4,571,264 A | 2/1986 | Weir et al. | 75/101 |
| 4,632,701 A | 12/1986 | Genik-Sas-Berezowsky et al. | 75/118 |
| 4,979,987 A | 12/1990 | Mason et al. | 75/744 |
| 5,071,477 A | 12/1991 | Thomas et al. | 75/744 |
| 5,096,486 A | 3/1992 | Anderson et al. | 75/734 |
| 5,232,491 A | 8/1993 | Corrans et al. | 75/743 |
| 5,256,189 A | 10/1993 | Patel et al. | 75/744 |
| 5,489,326 A | 2/1996 | Thomas et al. | 75/744 |
| 5,698,170 A | 12/1997 | King | 423/24 |
| 5,902,474 A | 5/1999 | Jones | 205/582 |
| 5,917,116 A | 6/1999 | Johnson et al. | 75/710 |

FOREIGN PATENT DOCUMENTS

WO WO 9607762 A1 3/1996

OTHER PUBLICATIONS

Thompson, P. et al., Pressure oxidation of silver–bearing sulfide flotation concentrates, Mining Engineering, Sep. 1993; pp. 1195–1200.

Dutrizac, J.E., et al., A Mineralogical Study of the Jarosite Phase Formed During the Autoclave Leaching of Zinc Concentrate; Canadian Metallurgical Quarterly, vol. 23, No. 2, pp. 147–157, 1984.

Tourre, J.M., Bull, W.R., and Spottiswood, D.J., "Oxidative acid pressure leaching of sulphidic ores and concentrates—the control of silver losses", International Symposium on Complex Sulfides, sponsored by TMS and CIM, San Diego, CA Nov. 1985.

* cited by examiner

Primary Examiner—Melvyn Andrews
(74) Attorney, Agent, or Firm—Marsh Fischmann & Breyfogle LLP

(57) ABSTRACT

A method for the treatment of sulfide ores containing silver by pressure oxidation. The method includes the addition of a sulfate-binding material to reduce the formation of jarosite species during pressure oxidation. Silver can then be recovered from the solids portion of the discharge slurry. A jarosite reduction step, such as by a lime boil, that is typically required to recover silver after pressure oxidation can advantageously be eliminated.

75 Claims, 9 Drawing Sheets

HIGH TEMPERATURE PRESSURE OXIDATION OF ORES AND ORE CONCENTRATES CONTAINING SILVER USING CONTROLLED PRECIPITATION OF SULFATE SPECIES

CROSS-REFERENCE TO RELATED APPLICATIONS

Not applicable

STATEMENT REGARDING FEDERALLY FUNDED RESEARCH

Not applicable

BACKGROUND OF THE INVENTION

1. Field of the Invention

The present invention relates to the treatment of ores and ore concentrates to recover metal values, and in particular relates to the pressure oxidation treatment of sulfide ores and ore concentrates to enable the recovery of precious metal values including silver.

2. Description of Related Art

Silver is a valuable precious metal and can be found in precious metal ores such as acanthite ($Ag_2S$). In addition, precious metals such as silver and gold are also found associated with other sulfide-containing ores.

There are many hydrometallurgical processes available for the treatment of silver-bearing sulfide ores to recover non-ferrous metal values (e.g., copper) as well as any gold that may be associated with the ore. However, the silver can be difficult to recover in an economically feasible manner using these processes.

Hydrometallurgical processes are generally preferred over methods such as smelting due to the environmental issues associated with smelting sulfide ores. Pressure oxidation is one known hydrometallurgical process for recovering metals from sulfide-containing ores and ore concentrates. During pressure oxidation, a slurry including the ore is subjected to elevated pressure and temperature while in contact with oxygen to decompose the minerals. The sulfide components of the ore are at least partially oxidized, liberating metals. The metals can then be recovered from the solids and/or the solution of the discharge slurry.

U.S. Pat. No. 5,698,170 by King discloses a method for the pressure oxidation of a copper-containing material followed by solvent extraction and electrowinning (SX/EW) to recover copper. The pressure oxidation step produces a high acid content solution, which is diluted after the pressure oxidation step and prior to recovery of the copper in a SX/EW circuit.

One of the problems associated with pressure oxidation of sulfide ores that also include iron is the formation of jarosite compounds. In particular, certain metals that can be found in the ore, including silver, preferentially form jarosite compounds during pressure oxidation. When the silver is associated with a jarosite compound, the silver is difficult to recover in an economical manner.

The article entitled "Pressure Oxidation of Silver-Bearing Sulfide Flotation Concentrates" by Thompson et al., (published in Mining Engineering, September 1993, pp. 1195–2000) discloses the pressure oxidation of sulfide flotation concentrates at a temperature of 160° C. to 225° C. It is disclosed that most of the silver in the autoclaved solids is associated with jarosites that are formed by hydrolysis of ferric sulfate. The silver associated with these jarosites is extremely refractory to cyanide leach treatment resulting in silver extractions of less than 5 percent. In order to recover higher levels of silver, the jarosites must be decomposed at an elevated temperature in the presence of lime (CaO), a process commonly referred to as a "lime boil." However, a lime boil uses excessive quantities of lime, often in excess of 400 lbs. per ton of autoclaved solids, and adds significantly to the cost associated with recovering the silver.

U.S. Pat. No. 5,096,486 by Anderson et al. discloses a process for extracting silver from silver sulfide bearing solids by leaching a metal bearing mineral with an aqueous liquid including sulfuric acid and sodium nitrite. The silver is solubilized and is recovered from pressure oxidation discharge solution by precipitating silver chloride. However, sodium nitrite forms nitric acid and the associated off-gases are extremely harmful, if discharged, to the environment. It is also disclosed that maintaining 115 g/l or more of sulfuric acid in the aqueous mixture of sulfuric and sodium nitrite will prevent the formation of argentojarosite and plumbojarosite.

It would be useful to provide a method for treating silver-bearing sulfide ore and/or sulfide ore concentrates by pressure oxidation such that the silver is not combined in substantial quantities with refractory minerals such as jarosite and such that the silver is amenable to extraction from the solids portion using conventional cyanide leach methods without the need for a jarosite destruction step.

BRIEF SUMMARY OF THE INVENTION

The present invention is directed to the pressure oxidation of a mineral feed that includes at least iron, sulfide sulfur and silver wherein the pressure oxidation conditions are controlled to reduce the formation of jarosite mineral species in the solids portion of the discharge slurry.

During pressure oxidation of sulfide minerals according to the prior art, particularly those including iron, substantial quantities of jarosite compounds are typically formed and discharged from the pressure oxidation reactor in the solids portion of the discharge slurry. Equations 1 and 2 are representative of the reactions that are believed to normally occur in the formation of jarosite from pyrite during pressure oxidation.

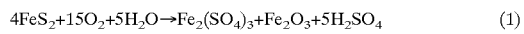
$$4FeS_2 + 15O_2 + 5H_2O \rightarrow Fe_2(SO_4)_3 + Fe_2O_3 + 5H_2SO_4 \quad (1)$$

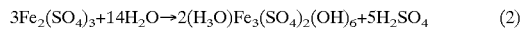
$$3Fe_2(SO_4)_3 + 14H_2O \rightarrow 2(H_3O)Fe_3(SO_4)_2(OH)_6 + 5H_2SO_4 \quad (2)$$

Various metals and functional groups found in the mineral feed can substitute for the hydronium ($H_3O$) group in the jarosite, including potassium (K), sodium (Na), rubidium (Rb), silver (Ag), thallium (Tl), ammonium ($NH_4$), lead (Pb) and mercury (Hg). When silver-containing jarosite species form, silver metal is very difficult to recover using conventional leaching methods without first subjecting the solids to a jarosite destruction step such as a lime boil.

In accordance with the present invention, the formation of jarosite species can be substantially inhibited by careful control over the pressure oxidation conditions. One way to control the pressure oxidation conditions is through the addition of a sulfate-binding material to the pressure oxidation step. The reactions that are believed to occur during the pressure oxidation step according to this embodiment of the present invention, when using calcium in the form of calcium carbonate as the sulfate-binding material, are illustrated by Equations 3, 4 and 5.

$$4FeS_2 + 15O_2 + 8H_2O \rightarrow 2Fe_2O_3 + 8H_2SO_4 \quad (3)$$

$$CaCO_3 + H_2SO_4 + H_2O \rightarrow CaSO_4 \cdot 2H_2O + CO_2 \quad (4)$$

$$CaSO_4 \cdot 2H_2O \rightarrow CaSO_4 + 2H_2O \quad (5)$$

As is illustrated by Equation 4, the added calcium from the calcium carbonate preferentially binds sulfate by forming calcium sulfate and inhibits the formation of other sulfate species, such as jarosites and iron sulfate. The iron is converted to insoluble hematite ($Fe_2O_3$) and therefore the amount of iron solubilized in the discharge liquid is also reduced. The silver, which under typical pressure oxidation conditions would be associated with jarosite, is precipitated as elemental silver, silver sulfide and/or silver inclusions in hematite, all of which are now recoverable in a standard leaching step without the need for a lime boil or similar jarosite destruction step.

When calcium is used as the sulfate-binding material in the form of a calcium compound such as calcium carbonate, most of the calcium crystallizes to form crystalline anhydrite ($CaSO_4$) in the discharge solids, which is more amenable to thickening and/or filtration than gypsum ($CaSO_4 \cdot 2H_2O$). The conversion of most of the iron to hematite in the solids portion of the discharge slurry also simplifies filtration and other downstream processing steps that may be used.

Thus, according to one embodiment of the present invention, a method for processing a mineral feed comprising iron, sulfide sulfur and silver to facilitate recovery of silver is provided. The method includes the steps of: pressure oxidizing an aqueous feed slurry that includes the mineral feed wherein at least about 70 percent of sulfide sulfur in the mineral feed is converted to sulfate sulfur; recovering from the pressure oxidizing step an aqueous discharge slurry comprising discharge solids and aqueous discharge liquid, the discharge solids comprising at least a portion of the silver and at least a portion of the iron from the mineral feed; and leaching at least a portion of the discharge solids with a leach solution to dissolve into the leach solution at least a portion of the silver from the discharge solids. Preferably, the concentration of dissolved iron in the discharge slurry is not greater than 1 gram of dissolved iron per liter of aqueous discharge liquid. Advantageously, the method of the present invention can be practiced without the use of a jarosite destruction step between the pressure oxidizing step and the leaching step.

According to another embodiment of the present invention, a method for the treatment of a mineral feed comprising iron, sulfide sulfur and silver is provided. The method includes the steps of pressure oxidizing an aqueous feed slurry including the mineral feed at a temperature of at least about 160° C. and withdrawing a discharge slurry from the pressure oxidation step that includes discharge solids and a discharge liquid, wherein the pressure oxidizing step is conducted in the presence of a sufficient concentration of a sulfate-binding material such that at least about 75 wt. % of the silver contained in the mineral feed is discharged in the discharge solids and not greater than 25 wt. % of the silver contained in the discharge solids is associated with jarosite species. Preferably, the sulfate-binding material is in the form of a compound selected from the group consisting of carbonates, hydroxides and oxides of metals selected from the group consisting of calcium, sodium, potassium and magnesium.

According to another embodiment, a method for recovering silver from a mineral feed comprising sulfide sulfur, iron and silver is provided. The method can include the steps of pressure oxidizing an aqueous slurry comprising the mineral feed in the presence of oxygen gas to convert at least 80 percent of the sulfide sulfur in the mineral feed to sulfate sulfur, the pressure oxidizing step being conducted at a temperature of at least 210° C. Discharge solids are recovered from the pressure oxidizing step, the discharge solids comprising at least a portion of the iron and a portion of the silver from the mineral feed and at least a portion of the silver is leached from the discharge solids recovered from the pressure oxidizing step wherein not greater than 25 wt. % of the iron in the discharge solids is contained in sulfate-containing compounds.

According to another embodiment of the present invention, a method for recovering silver from a mineral feed comprising silver, sulfide sulfur and iron is provided that includes the steps of pressure oxidizing the mineral feed in a reactor at a temperature of at least 190° C. to oxidize at least 90 percent of the sulfide sulfur in the mineral feed to sulfate sulfur and to produce silver-containing discharge solids and leaching at least a portion of the discharge solids with a leach solution to dissolve at least a portion of the silver into the leach solution. According to this embodiment, the pressure oxidizing step comprises feeding an aqueous feed slurry comprising the mineral feed to the reactor, feeding a sulfate-binding material to the reactor separate from the feed slurry and withdrawing from the reactor an aqueous discharge slurry including the discharge solids.

According to another embodiment of the present invention, a method is provided for recovering silver and a non-ferrous base metal from a mineral feed comprising sulfide sulfur, iron, silver and the non-ferrous base metal, with at least a portion of the non-ferrous base metal being contained in one or more sulfide minerals. The method includes the steps of pressure oxidizing the mineral feed by feeding an aqueous feed slurry comprising the mineral feed to a reactor, feeding oxygen gas to the reactor, oxidizing at least 90 percent of the sulfide sulfur in the mineral feed to sulfate sulfur and dissolving at least 90 percent of the non-ferrous base metal from the mineral feed into aqueous liquid in the reactor. An aqueous discharge slurry comprising discharge solids and an aqueous discharge liquid is discharged from the reactor, the discharge solids including at least 90 wt. % of the silver from the mineral feed and the aqueous discharge liquid having dissolved therein at least 90 wt. % of the non-ferrous base metal from the mineral feed. After the pressure oxidizing step, discharge solids are separated from the aqueous discharge liquid and the aqueous discharge liquid is processed to remove at least a portion of the non-ferrous base metal from the aqueous discharge liquid and the discharge solids are processed to remove at least a portion of the silver from the discharge solids. Preferably, during the pressure oxidizing, the reactor is maintained at a temperature of at least 190° C. and dissolved iron in the discharge slurry is maintained at a concentration of not greater than 1 gram of dissolved iron per liter of the discharge liquid.

DESCRIPTION OF THE INVENTION

Figure 1:
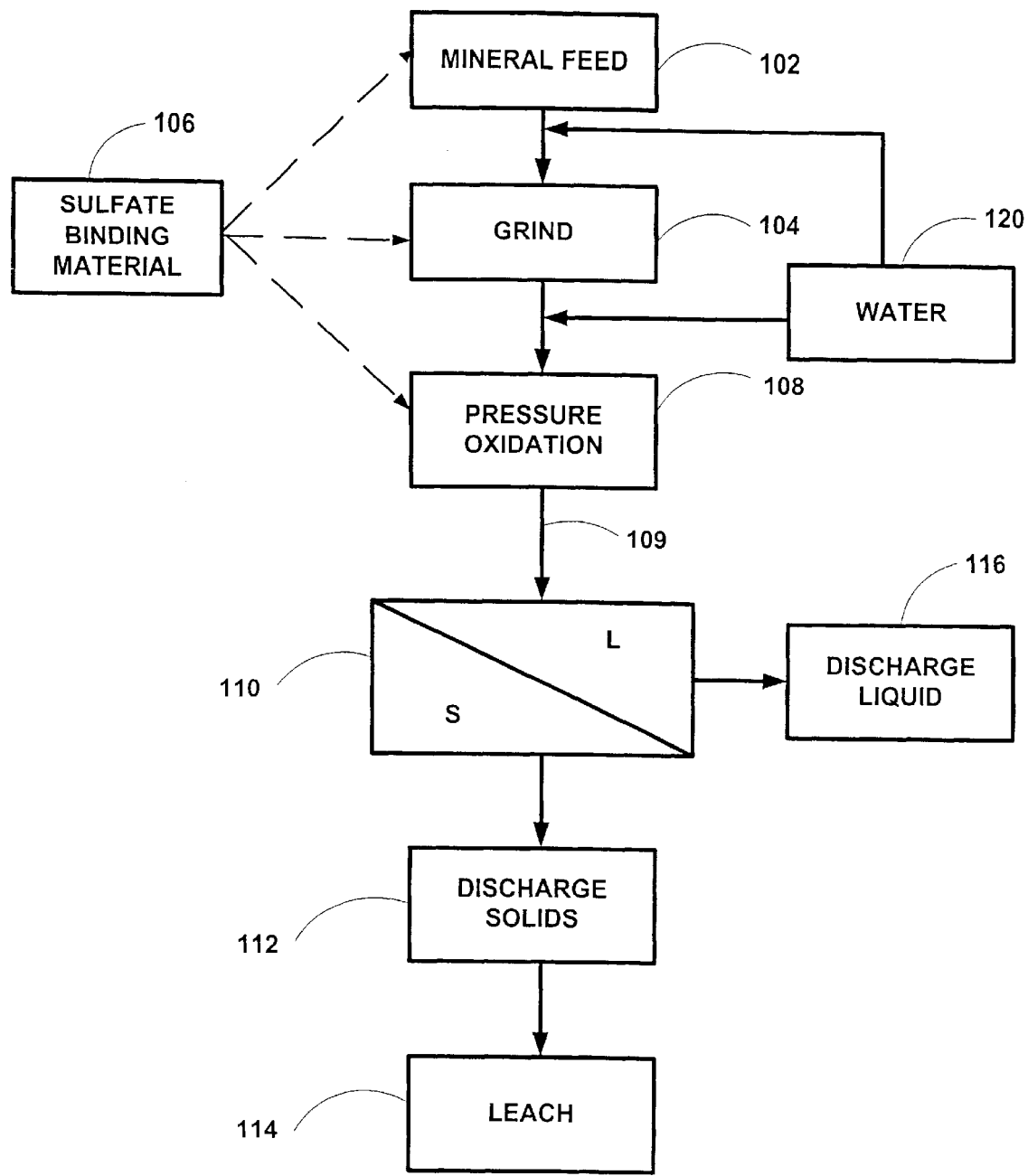
FIG. 1 illustrates a flowsheet of a pressure oxidation process according to an embodiment of the present invention.

The treatment of a mineral feed by pressure oxidation according to the present invention will now be described with reference to FIGS. 1–4. Referring to FIG. 1, the mineral feed 102 can include a raw mineral-containing ore that has not been pre-treated, sometimes referred to as a whole ore. Preferably, at least a portion of the mineral feed is an ore concentrate. For example, the mineral feed can be formed entirely from an ore concentrate or can be formed by mixing an ore concentrate with a whole ore. As is known to those skilled in the art, an ore concentrate can be formed from a raw ore, such as by milling the raw ore and subjecting the milled ore to flotation or other techniques to separate the desired minerals from the extraneous components of the raw ore. As used herein, the term ore refers to both whole ores and ore concentrates, as well as mixtures of whole ores and ore concentrates. The mineral feed can also include other components such as tailings enriched with sulfides and/or silver or other mineral processing byproducts.

According to the present invention, the mineral feed 102 includes at least iron, sulfide sulfur and silver. The silver can be in the form of a silver mineral (e.g., $Ag_2S$) and/or can be associated with other sulfide minerals. The mineral feed can also include a non-ferrous base metal such as copper, nickel, cobalt or zinc, as well as other metals such as antimony and arsenic. A variety of sulfide minerals can be included in the mineral feed and examples of such minerals are listed in Tables 1 to 6.

TABLE 1

Silver Minerals

| Mineral | Formula |
|---|---|
| Acanthite | $Ag_2S$ |
| Freibergite | $(Ag,Cu,Fe)_{12}(Sb,As)_4S_{13}$ |
| Polybasite | $(Ag,Cu)_{16}Sb_2S_{11}$ |
| Prousite | $Ag_3AsS_3$ |
| Pyrargyrite | $Ag_3SbS_3$ |
| Tetrahedrite | $(Ag,Cu,Fe,Zn)_{12}(Sb,As)_4S_{13}$ |
| Aguilarite | $Ag_4SeS$ |
| Antimonpearceite | $(Ag,Cu)_{16}(Sb,As)_2S_{11}$ |
| Argentite | $Ag_2S$ |
| Argentopentlandite | $Ag(Fe,Ni)_8S_8$ |
| Argentopyrite | $AgFe_2S_3$ |
| Argentiferrous Galena | PbS* |
| Jalpaite | $Ag_3CuS_2$ |
| McKinstyrite | $(Ag,Cu)_2S$ |
| Miargyrite | $AgSbS_2$ |
| Pearceite | $Ag_{16}As_2S_{11}$ |
| Pyrostilpnite | $Ag_3SbS_3$ |
| Stephanite | $Ag_5SbS_4$ |

TABLE 1-continued

Silver Minerals

| Mineral | Formula |
|---|---|
| Sternbergite | $AgFe_2S_3$ |
| Stromeyerite | $AgCuS$ |
| Xanthoconite | $Ag_3AsS_3$ |

*Argentiferrous Galena includes silver associated with the PbS

TABLE 2

Cobalt Minerals

| Mineral | Formula |
|---|---|
| Alloclasite | $(Co,Fe)AsS$ |
| Carrollite | $Cu(Co,Ni)_2S_4$ |
| Cattierite | $CoS_2$ |
| Cobalt Pentlandite | $Co_9S_8$ |
| Costibite | $CoSbS$ |
| Glaucodot | $(Co,Fe)AsS$ |
| Linnaeite | $Co_3S_4$ |
| Paracostibite | $CoSbS$ |
| Willyamite | $(Co,Ni)SbS$ |
| Cobaltite | $CoAsS$ |

TABLE 3

Nickel Minerals

| Mineral | Formula |
|---|---|
| Millerite | NiS |
| Pentlandite | $(Fe,Ni)_9S_8$ |
| Argentopentlandite | $Ag(Fe,Ni)_8S_8$ |
| Gersdorffite | NiAsS |
| Heazlewoodite | $Ni_3S_2$ |
| Mackinawite | $(Fe,Ni)_9S_8$ |
| Polydymite | $Ni_3S_4$ |
| Siegenite | $(Ni,Co)_3S_4$ |
| Ullmannite | NiSbS |
| Vaesite | $NiS_2$ |
| Violarite | $FeNi_2S_4$ |

TABLE 4

Zinc Minerals

| Mineral | Formula |
|---|---|
| Sphalerite | $(Zn,Fe)S$ |
| Wurtzite | $(Zn,Fe)S$ |
| Marmatite | $(Zn,Fe)S$ |

TABLE 5

Copper Minerals

| Mineral | Formula |
|---|---|
| Bornite | $Cu_5FeS_4$ |
| Chalcocite | $Cu_2S$ |
| Chalcopyrite | $CuFeS_2$ |
| Covellite | CuS |
| Digenite | $Cu_{1.8}S$ |
| Djurleite | $Cu_{1.97}S$ |
| Enargite | $Cu_3AsS_4$ |
| Tennantite | $(Cu,Fe)_{12}As_4S_{13}$ |
| Tetrahedrite | $(Cu,Fe)_{12}Sb_4S_{13}$ |
| Anilite | $Cu_{1.75}S$ |

TABLE 5-continued

Copper Minerals

| Mineral | Formula |
|---|---|
| Cubanite | $CuFe_2S_3$ |
| Famatinite | $Cu_3SbS_4$ |
| Goldfieldite | $Cu_{12}(Te,As)_4S_{13}$ |
| Idaite | $Cu_5FeS_6$ |
| Iuzonite | $Cu_3AsS_4$ |
| Stannite | $Cu_2FeSnS_4$ |

TABLE 6

Iron Minerals

| Mineral | Formula |
|---|---|
| Pyrite | $FeS_2$ |
| Pyrrhotite | $Fe_{1-x}S$ (where x is 0 to 0.17) |
| Marcasite | $FeS_2$ |
| Greigite | $Fe_2S_4$ |

The present invention is particularly applicable to mineral feeds that include copper-containing sulfide minerals (Table 5). In one embodiment, the mineral feed includes a sulfide mineral selected from chalcocite, chalcopyrite, bornite, covellite, digenite, enargite and tetrahedrite. Typically, the mineral feed will include a mixture of two or more minerals.

The silver should be present in the mineral feed 102 in sufficient amounts so that extraction of the silver is economically justified. Accordingly, the mineral feed preferably includes a silver concentration of at least about 50 grams per metric ton (g/mt) and more preferably at least about 150 g/mt. Gold is often found associated with sulfide minerals and in one embodiment, the mineral feed includes gold in addition to the silver.

Preferably, the particles of the mineral feed 102 have a particle size distribution such that the P80 is not greater than about 220 μm (about 65 mesh) and more preferably is not greater than about 75 μm. The P80 is the aperture size through which 80 wt. % of the mineral feed particles will pass. Stated another way, no more than 20 wt. % of the particles are larger than the P80 value. If necessary, the mineral feed can be comminuted 104 by grinding or milling prior to pressure oxidation to reduce the particle size of the mineral feed and the mineral feed can be mixed with an aqueous-based liquid 120 prior to grinding of the feed.

With continued referenced to FIG. 1, the mineral feed is mixed with aqueous-based liquid 120 to form a mineral feed slurry that is amenable to pressure oxidation 108 in an autoclave. The mineral feed slurry that is formed by mixing the mineral feed with the aqueous-based liquid (before and/or after grinding) can include a wide range of solids loading, such as from about 5 wt. % solids up to about 65 wt. % solids.

The mineral feed slurry is subjected to pressure oxidation 108 in one or more autoclaves. For example, an autoclave having a plurality of compartments arranged in series can be utilized wherein the mineral feed slurry continuously moves through the individual compartments. This advantageously enables controlled adjustments to be made during the retention time in the autoclave, such as the addition of chemical additives or a change in the treatment temperature. A single autoclave having only one compartment that is operated in either batch or continuous made can also be used. Multiple, single-compartment autoclaves can also be used. For example, multiple single-compartment autoclaves can be vertically disposed with respect to each other such that gravity causes the mineral feed slurry to flow from one autoclave to the next until the pressure oxidation step is complete.

The autoclave discharge slurry 109 from the pressure oxidation step 108 is then transferred to a solid/liquid separation step 110. As is described in more detail below, metals can then be recovered from the discharge liquid 116 and/or from the discharge solids 112.

During pressure oxidation, the sulfide sulfur ($S^=$) in the mineral feed is at least partially oxidized and some of the non-ferrous base metals, if any, are at least partially solubilized to form the autoclave discharge slurry 109. Typically, the non-ferrous base metals solubilized from the mineral feed will include one or more of copper, zinc, nickel and cobalt. These dissolved base metals can optionally be recovered from the discharge liquid 116 portion of the autoclave discharge slurry, as is discussed below.

According to the present invention, the precipitation of jarosite mineral species (e.g., plumbojarosite) during the pressure oxidation step is reduced through control of the conditions within the autoclave. One method to control jarosite precipitation is to control the speciation of the sulfur and to preferentially precipitate iron-free sulfate species during the pressure oxidation step. The precipitation of iron-free sulfate species can be accomplished by adding a sufficient amount of a sulfate-binding material 106 during or prior to pressure oxidation 108. The sulfate-binding material can be added as a component of the mineral feed slurry or can be added separately to the pressure oxidation reactor separate from the mineral feed slurry. In a particularly preferred embodiment, a first portion of the sulfate-binding material is introduced with the mineral feed slurry and a second portion of sulfate-binding material is added to the autoclave separate from the mineral feed slurry. Preferably, the first portion is larger than the second portion.

The sulfate-binding material 106 is a material that is capable of preferentially forming iron-free sulfate species during the pressure oxidation step. The sulfate-binding material can be selected from a sodium-containing material, a potassium-containing material, a magnesium-containing material and a calcium-containing material, and calcium-containing materials are particularly preferred. Further, the sulfate-binding material can preferably be in the form of a carbonate, oxide or hydroxide compound, such as carbonate, oxide and hydroxide compounds of sodium, potassium, magnesium or calcium. Preferred sulfate-binding materials include carbonates of calcium, sodium, potassium and magnesium. For example, limestone ($CaCO_3$), soda ash ($Na_2CO_3$), trona ($Na_2CO_3.NaHCO_3.2H_2O$) or other naturally-occurring carbonate-containing minerals can be used as the sulfate-binding material. Calcium-containing materials such as calcium carbonate, calcium oxide and calcium hydroxide are also preferred. Particularly preferred sulfate-binding materials according to the present invention are those that include calcium carbonate, such as limestone and dolomite ($CaMg(CO_3)_2$). The sulfate-binding material can be provided in a raw state (e.g., raw limestone) or in purified form. The sulfate-binding material is preferably provided with a particle size distribution (e.g., a P80 value) that is similar to that of the mineral feed.

When the sulfate-binding material is in the form of a carbonate compound, the carbonate is preferably added to the mineral feed at a rate and in a sufficient quantity such that the ratio of available sulfur ($S_{avail}$) to carbonate ($CO_3^-$) is maintained within a specified range. As used herein, the available sulfur includes the sulfur that is added as a component of the mineral feed (sulfide sulfur) and the sulfur that is added as a soluble sulfur species (e.g., sulfate sulfur). Most of the available sulfur is derived from the sulfide sulfur that is a component of the mineral feed. A particularly preferred ratio of available sulfur to carbonate ($S_{avail}$:$CO_3$) is not greater than 2.0:1, such as between 0.6:1 and 2.0:1.

Through the addition of a sulfate-binding material 106, the conditions during pressure oxidation 108 can also be controlled such that most of the iron contained in the mineral feed (e.g., in the form of an iron-containing sulfide mineral) reacts to form hematite ($Fe_2O_3$) rather than sulfate-containing compounds such as jarosite or iron sulfate. Due to the formation of insoluble hematite from the iron, the autoclave discharge slurry preferably includes no greater than about one gram of dissolved iron per liter of discharge liquid (g/l), more preferably no greater than about 0.5 g/l of dissolved iron and even more preferably no greater than about 0.3 g/l of dissolved iron. Further, no greater than about 25 wt. % of the iron in the discharge solids 112 is contained in sulfate-containing compounds, such as iron sulfate or jarosite, and even more preferably not greater than about 10 wt. % of the iron in the discharge solids is contained in sulfate-containing compounds.

Many prior art pressure oxidation processes only partially oxidize the sulfide sulfur to elemental sulfur, which is then recovered from the reactor in the discharge solids. During pressure oxidation of the sulfide materials according to the present invention, a substantial quantity of the sulfide sulfur in the mineral feed 102 is fully oxidized to sulfate sulfur ($SO_4^=$). Preferably, at least about 70 percent of the sulfide sulfur is fully oxidized to sulfate sulfur, more preferably at least about 80 percent of the sulfide sulfur is fully oxidized to sulfate sulfur and even more preferably at least about 90 percent of the sulfide sulfur is fully oxidized to sulfate sulfur. In one embodiment, at least about 96 percent of the sulfide sulfur is fully oxidized to sulfate sulfur. Stated another way, it is preferred that no greater than about 30 percent of the sulfide sulfur is partially oxidized to elemental sulfur in the discharge slurry. More preferably no greater than about 20 percent and even more preferably no greater than about 10 percent of the sulfide sulfur is partially oxidized to elemental sulfur in the discharge slurry.

The addition of a sulfate-binding material and the precipitation of iron-free sulfate species during pressure oxidation according to the present invention also reduce the amount of sulfate that is complexed as acid and results in a decreased free acid content as compared to conventional pressure oxidation processes. Accordingly, the free acid content (measured as $H_2SO_4$) of the discharge slurry from the pressure oxidation step is a good measure of the sulfate-species precipitation. The free acid level is preferably not greater than about 30 grams per liter of discharge liquid and more preferably is not greater than about 25 g/l. Further, the free acid level is at least about 5 g/l and more preferably is at least about 10 g/l. A particularly preferred range is from about 12 to 22 g/l of free acid. The free acid is the quantity of acid that would remain in solution if the hydrolyzable ions were removed.

The pressure oxidation step according to the present invention is a high temperature pressure oxidation step. During pressure oxidation, the mineral feed slurry is preferably maintained at a temperature of at least about 160° C., such as at least about 190° C., more preferably at least about 210° C. and even more preferably at least about 220° C.

The overall gas pressure in the autoclave is equal to the steam pressure plus the pressure due to non-condensible gases. Oxygen is added to the contents of the autoclave during pressure oxidation and $CO_2$ evolves from the sulfate-binding material when the material includes a carbonate. It is preferred that the overpressure attributed to the non-condensible gases ($O_2$, $CO_2$, Ar, $N_2$, etc. . . . ) is preferably from about 25 psi to 150 psi (172 kPa to 1035 kPa).

To ensure completion of the desired reactions, the total mean retention time in the pressure oxidation reactor is preferably at least about 20 minutes and more preferably is at least about 60 minutes. Further, the mean retention time preferably does not exceed about 180 minutes and more preferably does not exceed about 120 minutes.

Figure 2:
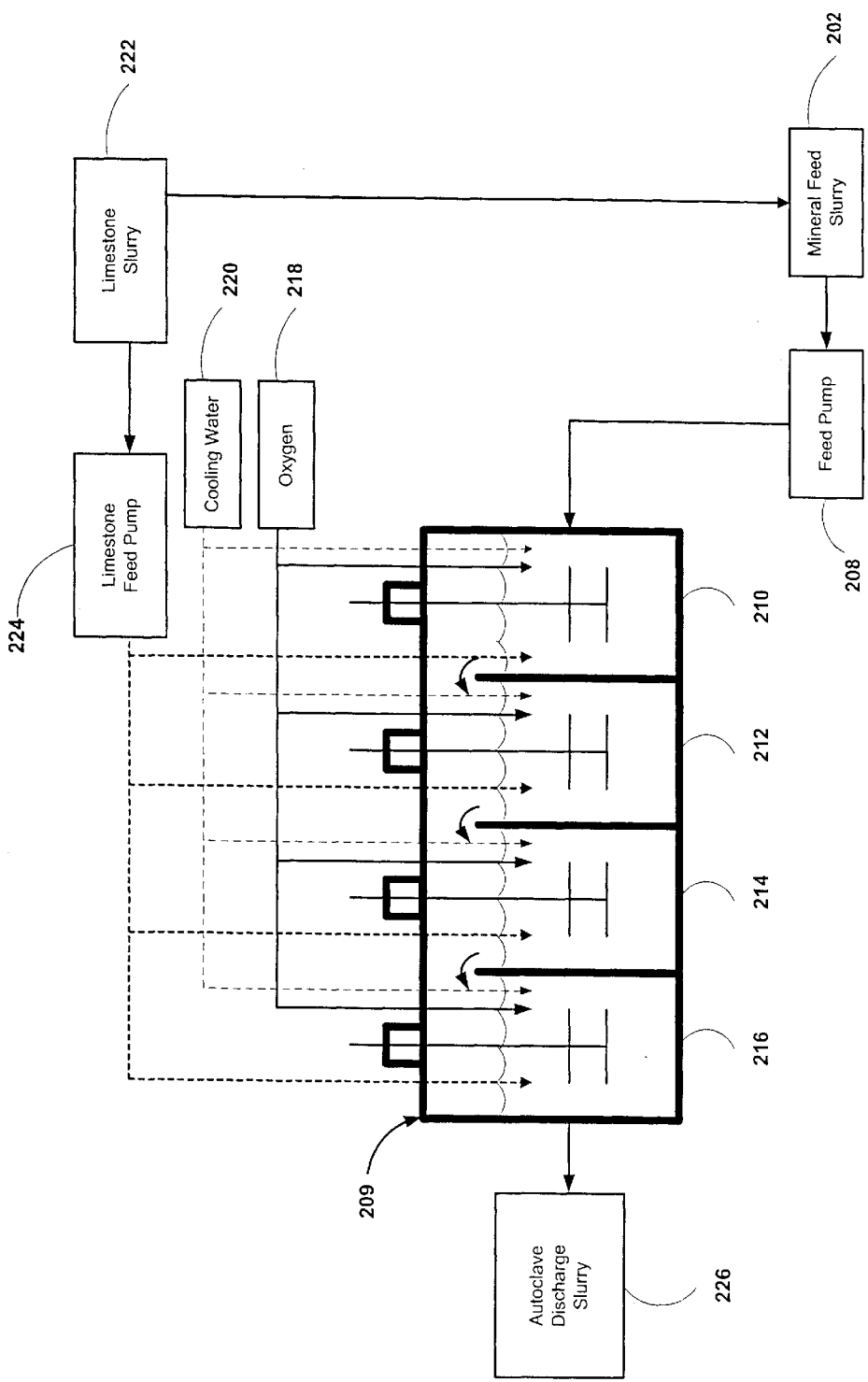
FIG. 2 illustrates a flowsheet of a pressure oxidation process according to an embodiment of the present invention.

A flowsheet schematically illustrating an embodiment of the present invention employing a multi-compartment autoclave for pressure oxidation of a mineral feed slurry is illustrated in FIG. 2.

A mineral feed slurry 202 is delivered to the multi-compartment autoclave 209 using a feed pump 208. The autoclave 209 includes 4 sequential compartments, 210, 212, 214 and 216 connected in series. Although the autoclave illustrated in FIG. 2 includes 4 compartments, it will be appreciated that the autoclave can include any number of compartments. Prior to injection into the multi-compartment autoclave 209, sulfate-binding material in the form of a limestone slurry 222 can be added to the mineral feed slurry 202. The use of a sulfate-binding material in the form of limestone is often advantageous due to the relatively low cost and widespread availability of limestone.

The mineral feed slurry 202 is introduced into a first compartment 210 of the autoclave 209 and the slurry continuously flows through the multiple compartments of the autoclave at a flow rate selected to yield the desired total mean residence time in the autoclave. Additional limestone slurry 222 can be introduced to the multi-compartment autoclave using a feed pump 224. As is illustrated in FIG. 2, the additional limestone can be added to any one or several of the autoclave compartments. Splitting the addition of the sulfate-binding material among different stages of the pressure oxidation step can advantageously result in improved recovery of silver as well as improved recovery of non-ferrous base metals from the mineral feed.

It is preferred that the pressure oxidation conditions described above with respect to FIG. 1 be maintained within each compartment of the autoclave 209, although the conditions within the individual autoclave compartments can be different than other autoclave compartments. For example, cooling water 220 can be added to maintain the temperature of one or more compartments within a preferred range, which may be different than the temperature of other compartments in the autoclave. Oxygen 218 can be injected into the slurry contained in each autoclave compartment to maintain the desired oxygen gas overpressure. Gases are vented from the autoclave, as needed.

The slurry continuously flows through the autoclave, eventually reaching a third compartment 214 and then a fourth compartment 216 of the autoclave. After completion of the pressure oxidation in the autoclave 209, the treated mineral feed slurry can be extracted from the autoclave in the form of an autoclave discharge slurry 226.

According to one embodiment of the present invention, a control loop is utilized wherein at least one property of the contents of the autoclave, the composition of the autoclave discharge slurry or the autoclave vent gas is monitored and analyzed, such that adjustments to the pressure oxidation process can be made, if necessary. With respect to the contents of the autoclave, the temperature or the pressure can be monitored and analyzed. For the autoclave discharge slurry, the free acid level, emf or chemical composition can be monitored and analyzed. For example, the chemical composition (e.g., dissolved iron content) or free acid level can be measured. For the autoclave vent gas, the composition of the gas (e.g., the $O_2$ or $CO_2$ content) can be monitored and analyzed.

Based on the analysis of one or more of the foregoing properties, an adjustment can be made to the pressure oxidation process such as adjusting the feed rate of the sulfate-binding material and/or the mineral feed slurry or adjusting the composition of the sulfate-binding material and/or the mineral feed slurry. The temperature and/or the pressure of the autoclave can also be adjusted.

After pressure oxidation, the autoclave discharge slurry will be composed of discharge solids and discharge liquid. A method for the treatment of the autoclave discharge slurry to recover precious metals is illustrated by the flowsheet in FIG. 3.

The autoclave discharge slurry 326 is first subjected to solid-liquid separation 328 to separate the slurry into the discharge liquid 330 and the discharge solids 340. For example, the slurry can be treated using a thickening and decantation process to separate the solids from the liquid. Wash water 336 can be used to rinse the solids and enhance recovery of solubilized metal values.

The pressure oxidation process of the present invention can advantageously form compounds in the discharge solids that simplify the solid-liquid separation step 328. For example, the addition of a sulfate-binding material in the form of calcium carbonate in the pressure oxidation step advantageously results in the formation of a significant quantity of anhydrite ($CaSO_4$), as well as hematite. Both of these compounds enable the use of a thickener or filter having a reduced area, thereby reducing capital costs associated with the process. Hermatite is also more environmentally stable than other iron compounds such as jarosites or iron sulfate, simplifying disposal of the tailings after removal of precious metals.

Accordingly, it is preferred that at least about 75 wt. % and more preferably at least about 90 wt. % of the iron contained in the discharge solids is in hematite. It is also preferred that no greater than about 25 wt. % of the iron in the discharge solids is in sulfate-containing compounds (e.g., jarosite or iron sulfate) and more preferably no greater than about 10 wt. % of the iron in the discharge solids is in sulfate-containing compounds.

Preferably, the discharge solids will include at least about 75 wt. % of the silver contained in the mineral feed and more preferably at least about 90 wt. % of the silver contained in the mineral feed. Advantageously, metals such as silver can be recovered in significant quantities from the discharge solids without the use of a jarosite destruction step, such as a lime boil.

Prior to leaching 342, the discharge solids 340 can be neutralized 344, if necessary. The discharge solids are then subjected to leaching 342 wherein silver and gold can be recovered from the discharge solids using known alkali-based or acid-based leaching technologies, such as a cyanide leach, a chloride leach, an ammonium thiosulfate leach or a thiourea leach.

In one embodiment, the discharge solids 340 are subjected to a cyanide leach wherein a cyanide leach solution is contacted with the discharge solids to recover metals from the discharge solids. According to the present invention, the total cyanide consumption during the cyanide leach is generally reduced, particularly when a lime boil is avoided. Under ordinary pressure oxidation conditions, the iron is predominately in a form (e.g., jarosite or iron sulfate) where a portion of the iron solubilizes in the process of cyanide leaching and consumes cyanide and therefore the leach requires higher cyanide solution concentrations to recover the silver and gold. The formation of stable hematite according to the present invention reduces the consumption of cyanide attributed to the soluble iron species. For example, the discharge solids can be contacted with a leach solution including NaCN at a concentration of about 3 g/l of leach solution. Preferably, the pH of the cyanide leach step is least about pH 9.5.

The present invention enables the recovery of high levels of silver without a jarosite destruction step since the formation of jarosite species is reduced through control over the pressure oxidation conditions. Preferably, not greater than about 50 wt. %, more preferably not greater than about 20 wt. % and even more preferably not greater than about 10 wt. % of the silver contained in the discharge solids is associated with jarosite species. Further, at least about 50 wt. % of the silver contained in the mineral feed is dissolved into the leach solution and can be recovered from the leaching step. More preferably, at least about 75 wt. % of the silver is dissolved in the leach solution and can be recovered and even more preferably at least about 85 wt. % of the silver contained in the mineral feed is dissolved in the leach solution and can be recovered. When the mineral feed also includes gold, it is preferred that at least about 80 wt. % and more preferably at least about 94 wt. % of the gold contained in the mineral feed is dissolved in the leach solution and therefore can be recovered from the discharge solids.

Figure 4:
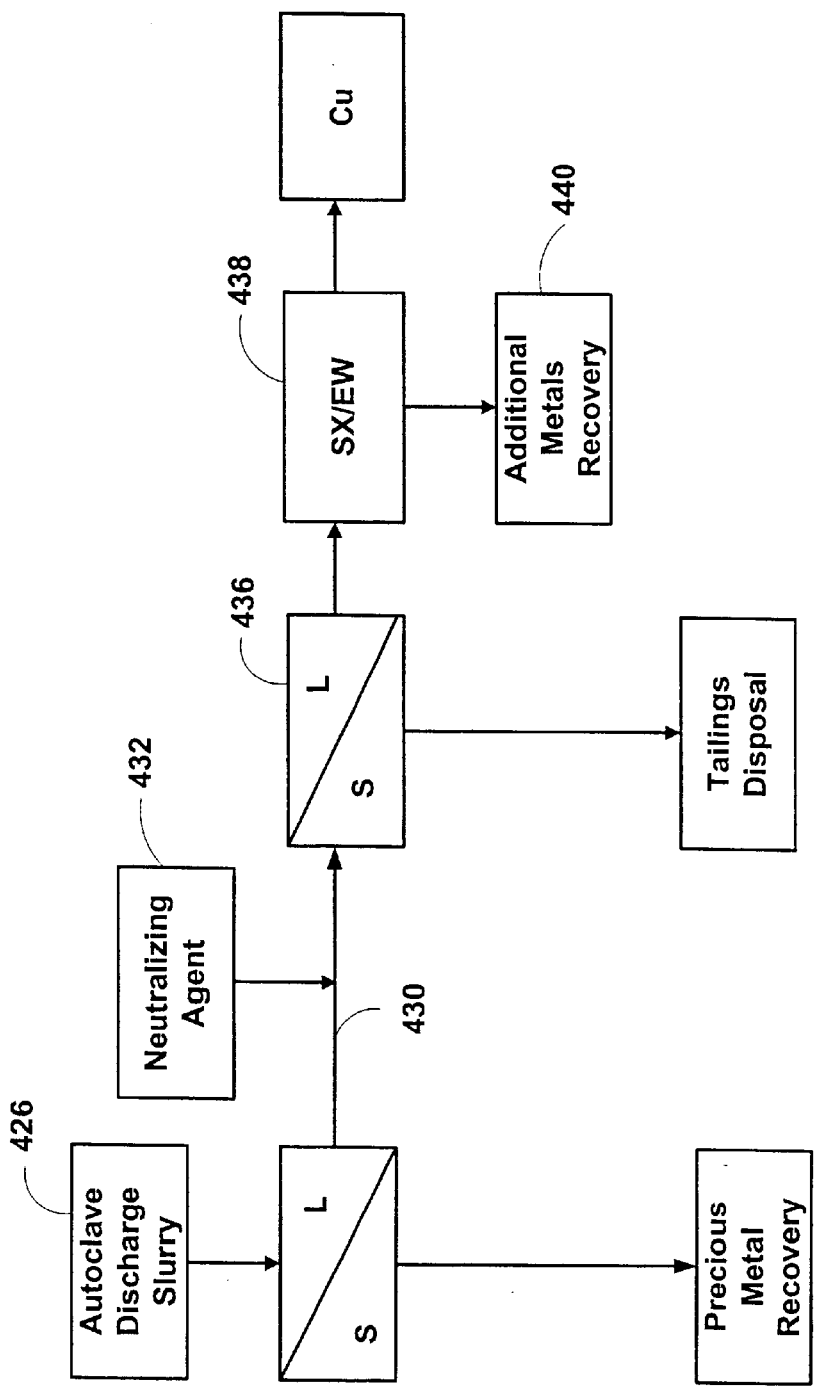
FIG. 4 illustrates a flowsheet of a pressure oxidation process with precious metal recovery and base metal recovery according to an embodiment of the present invention.

FIG. 4 is a flowsheet illustrating the treatment of the autoclave discharge slurry 426 including the recovery of a non-ferrous base metal (copper) from the discharge liquid 430.

Figure 3:
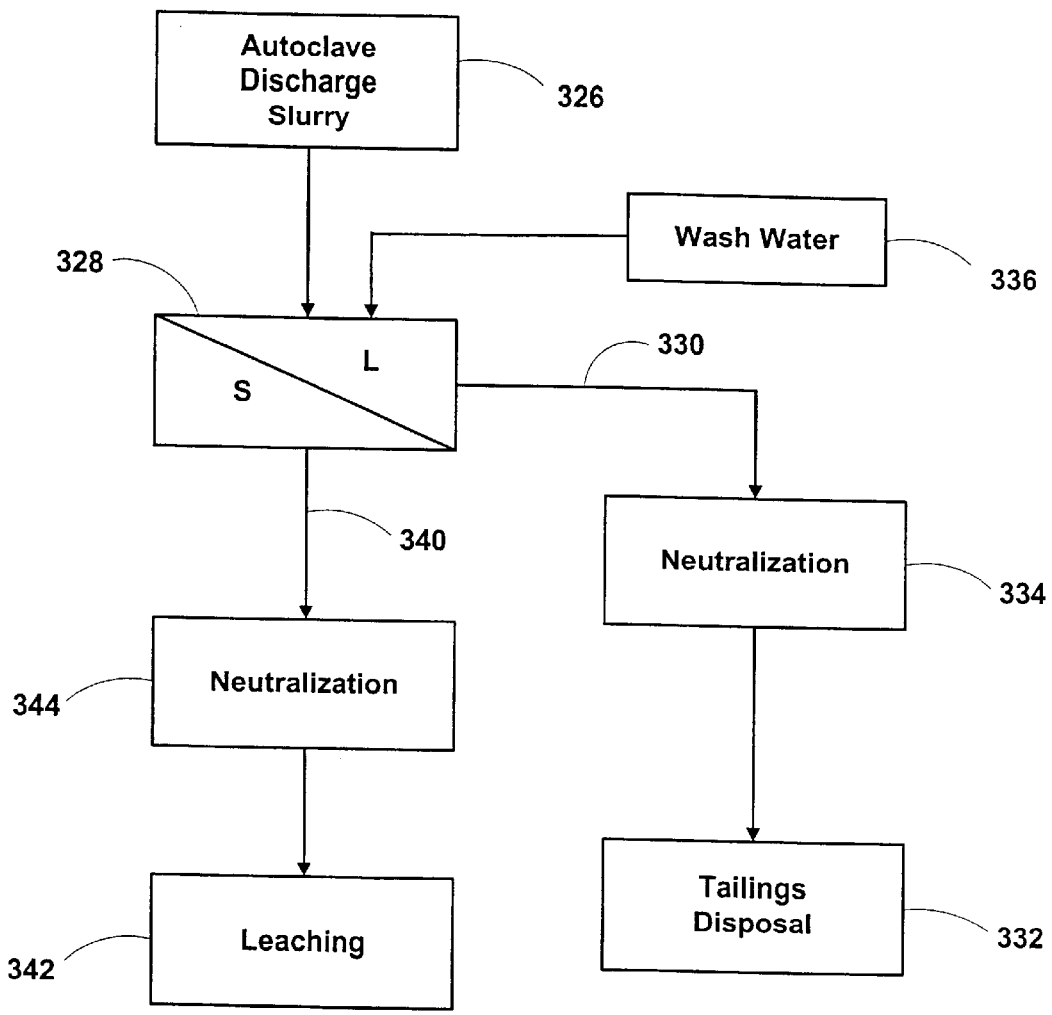
FIG. 3 illustrates a flowsheet of a pressure oxidation process with silver recovery according to an embodiment of the present invention.

The discharge slurry is subjected to solid-liquid separation as described with respect to FIG. 3. The discharge solids can be washed with an aqueous wash liquid, which can then be added to the discharge liquid. Referring back to FIG. 4, the discharge liquid 430 can then be neutralized prior to solvent extraction, such as by adding a neutralizing agent 432 to raise the pH of the discharge liquid, such as to a pH from about pH 1.5 to about pH 2.5. The neutralizing agent is normally a calcium-containing component, such as calcium carbonate, calcium oxide, calcium hydroxide and combinations thereof. For example, limestone or dolomite can be used as the neutralizing agent.

The discharge liquid 430 including solubilized copper can then be subjected to further solid-liquid separation 436 and treated by solvent extraction and electrowinning 438 to recover copper metal therefrom. In one embodiment, the discharge liquid is then treated 440 to recover other base metals such as zinc, nickel or cobalt. For example, zinc can be recovered by MgO precipitation. Other methods that can be used for metals recovery 438 and 440 include cementation, chemical precipitation, ion exchange and crystallization. Preferably, at least about 90 wt. % of the economically recoverable non-ferrous base metals selected from copper, zinc, nickel and cobalt contained in the mineral feed can be recovered from the discharge liquid.

EXAMPLES

The following examples illustrate various embodiments of the present invention, including the useful operating parameters for pressure oxidation of a sulfide-containing mineral feed including silver.

Two different mineral feed concentrates were utilized in the following examples. The compositions of the two mineral feeds, referred to as PH15 and PH17, are listed in Table 7. PH15 and PH17 include copper in the form of chalcopyrite with some covellite, pyrite, galena and sphalerite.

TABLE 7

Mineral Feed Compositions

|  |  | Mineral Feed | |
| --- | --- | --- | --- |
| Assay | Unit | PH15 | PH17 |
| Cu | wt. % | 15.4 | 17.3 |
| Zn | wt. % | 3.46 | 3.39 |
| Pb | wt. % | 1.99 | 2.12 |
| Fe | wt. % | 26.8 | 26.9 |
| Au | g/mt | 49.39 | 55.37 |
| Ag | g/mt | 529 | 579 |
| F- | ppm | 802 | 789 |
| Cd | ppm | 612 | 602 |
| Bi | ppm | 862 | 940 |
| $CO_3$ | wt. % | 0.34 | 0.38 |
| As | ppm | 404 | 346 |
| Hg | ppm | 18.9 | 18.8 |
| Sb | ppm | 95.5 | 103.2 |
| S(total) | wt. % | 30.8 | 31.9 |
| $SO_4$ | wt. % | 0.10 | 0.07 |
| S° | wt. % | 4.71 | 4.24 |
| S⁻ | wt. % | 26.0 | 27.7 | g/mt = grams per metric ton (1000 kg)

TABLE 8

| Example | Mineral Feed | $S_{avail}:CO_3$ Ratio | Retention Time (mins) | Conc. Feed Rate (kg/hr) | Limestone Feed Rate (kg/hr) | Conc. Feed Solids (%) |
| --- | --- | --- | --- | --- | --- | --- |
| 1 | PH15 | 88 | 75 | 3.25 | — | 16.4 |
| 2 | PH15 | 88 | 60 | 4.05 | — | 16.4 |
| 3 | PH15 | 88 | 90 | 2.68 | — | 15.4 |
| 4 | PH15 | 3.6 | 75 | 3.25 | 0.45 | 16.9 |
| 5 | PH15 | 1.0 | 75 | 4.28 | 1.41 | 10.2 |
| 6 | PH17 | 88 | 75 | 2.60 | — | 12.0 |
| 7 | PH17 | 1.0 | 75 | 2.60 | 1.61 | 12.7 |
| 8 | PH17 | 1.0 | 75 | 2.29 | 1.42 | 12.0 |
| 9 | PH17 | 1.25 | 75 | 2.29 | 1.13 | 11.9 |
| 10 | PH17 | 1.5 | 75 | 2.29 | 0.94 | 11.9 |

Examples 1–3 and 6 did not utilize the addition of limestone in accordance with the present invention. Examples 4, 5 and 7–10 employed varying levels of limestone addition, expressed as the $S_{avail}:CO_3$ ratio.

After pressure oxidation, the discharge slurry was separated to form discharge liquid and discharge solids. The discharge solids were subjected to cyanide leaching, with and without a lime boil, and the discharge liquid was treated to remove copper using standard solvent extraction methods and zinc using MgO precipitation.

Figure 5:
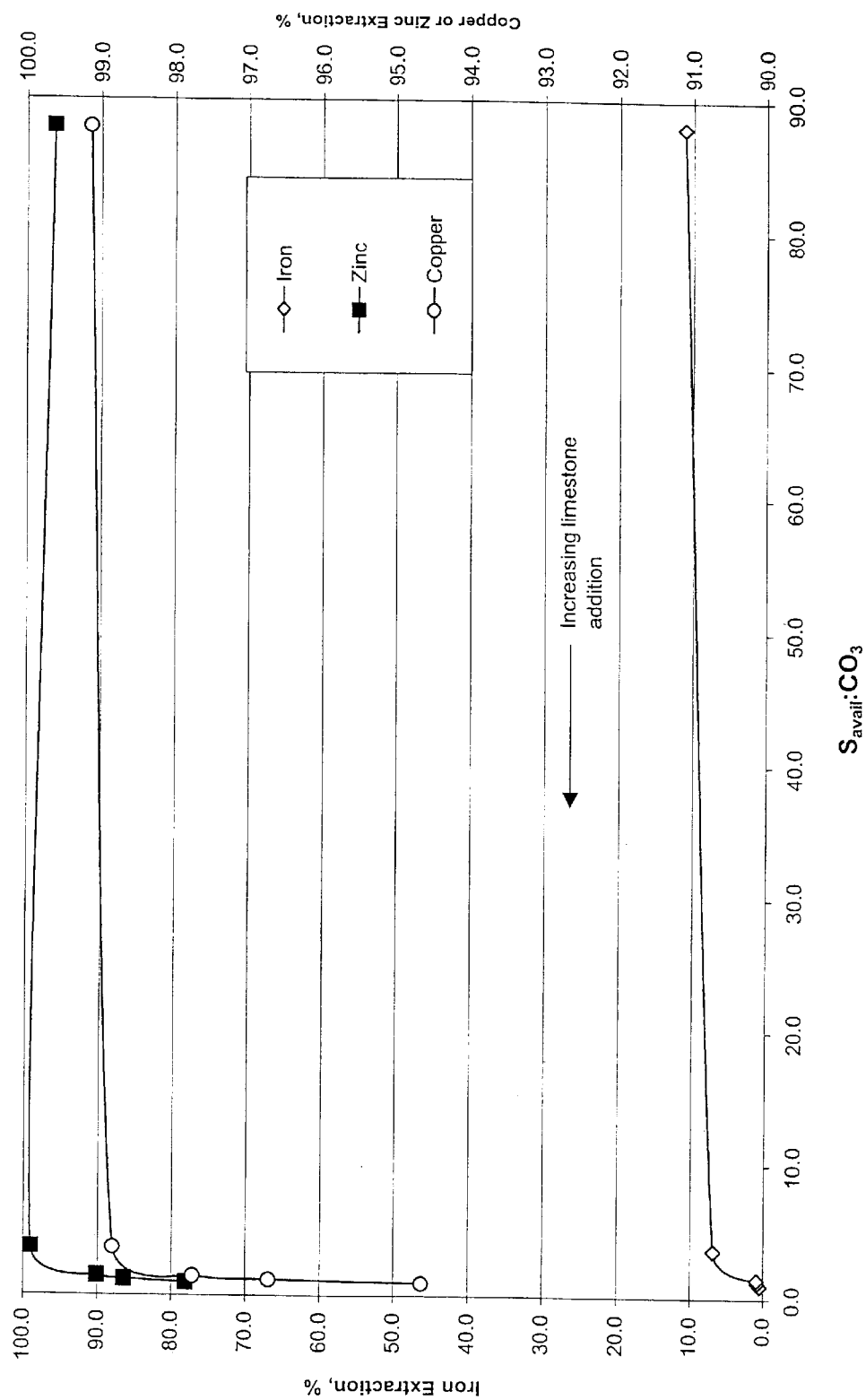
FIG. 5 illustrates the effect of adding a sulfate-binding material to the pressure oxidation step on base metal extractions according to the present invention.
Figure 6:
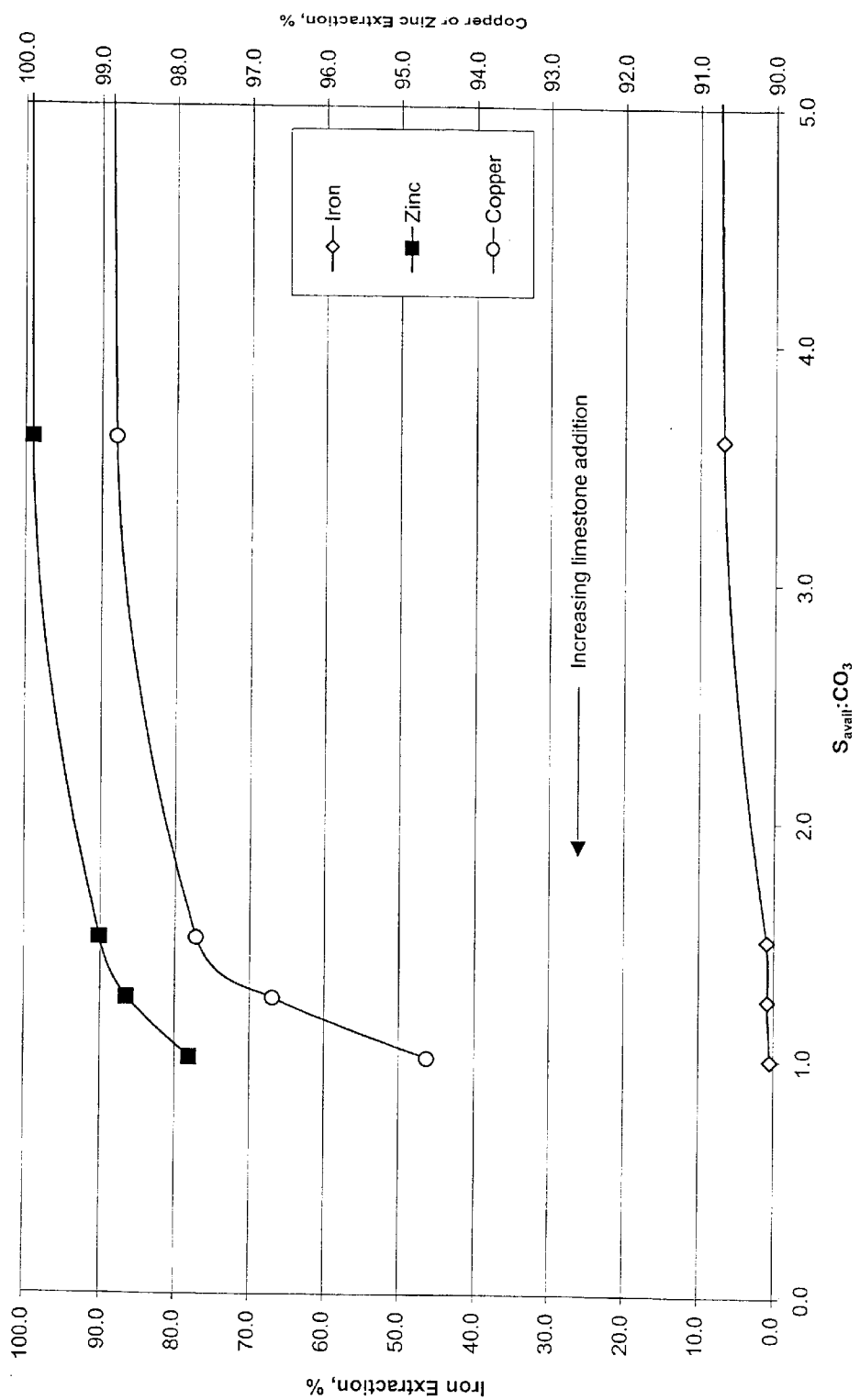
FIG. 6 illustrates the effect of adding a sulfate-binding material to the pressure oxidation step on base metal extractions according to the present invention.

Table 9 illustrates the quantity of base metals (Cu, Fe and Zn) that were extracted into the discharge liquid as a percentage of the metals contained in the mineral feed. These results are also illustrated by the graphs illustrated in FIGS. 5 and 6. FIG. 5 illustrates the extraction results for a $S_{avail}:CO_3$ ratio of up to 88 (representing the naturally occurring amount of $CO_3$ in the concentrate). FIG. 6 illustrates the results up to a $S_{avail}:CO_3$ ratio of 5.0 in more detail.

TABLE 9

| | | Discharge Liquid | | | | | Extraction (%) | | |
| --- | --- | --- | --- | --- | --- | --- | --- | --- | --- |
| Example | $S_{avail}:CO_3$ Ratio | Cu (g/l) | Fe (g/l) | Zn (g/l) | $H_2SO_4$ (g/l) | emf (mV) | Cu | Fe | Zn |
| 1 | 88 | 25.1 | 5.28 | 5.50 | 55.7 | 556 | 99.4 | 21.0 | 99.7 |
| 2 | 88 | 25.0 | 6.39 | 5.44 | 51.8 | 548 | 99.0 | 16.5 | 99.6 |
| 3 | 88 | 26.9 | 4.89 | 5.45 | 59.3 | 567 | 99.0 | 8.9 | 99.0 |
| 4 | 3.6 | 25.8 | 4.30 | 5.61 | 57.5 | 554 | 98.8 | 9.2 | 99.4 |
| 5 | 1.0 | 19.3 | 0.163 | 4.71 | 14.7 | 455 | 95.1 | 0.5 | 98.1 |
| 6 | 88 | 22.1 | 3.01 | 3.85 | 52.5 | 556 | 99.5 | 13.4 | 99.7 |
| 7 | 1.0 | 24.7 | 0.218 | 4.62 | 12.7 | 450 | 97.7 | 1.3 | 98.6 |
| 8 | 1.0 | 18.8 | 0.187 | 4.20 | 13.8 | 439 | 94.1 | 0.5 | 97.5 |
| 9 | 1.25 | 19.3 | 0.251 | 3.97 | 21.1 | 468 | 96.7 | 0.8 | 98.6 |
| 10 | 1.5 | 18.8 | 0.303 | 3.96 | 28.3 | 508 | 97.7 | 0.9 | 99.0 |

Use of a Sulfate-Binding Material

Examples were prepared to evaluate the effect of adding a sulfate-binding material to the pressure-oxidation step. In the following examples, calcium carbonate in the form of limestone was added to the autoclave with the mineral feed. Table 8 summarizes the pressure oxidation conditions for Examples 1–10. For each of the examples listed in Table 8, the mineral feed had a P80 of 25 to 30 μm. For Examples 1–4 the limestone was a high purity commercial limestone including 59 wt. % $CO_3$ (the nominal $CO_3$ in $CaCO_3$ is 60.0 wt. %). For Examples 5–10 the limestone was a raw limestone having a $CO_3$ content of 51.1 wt. %.

Copper extractions without carbonate addition were over 99 percent and were reduced by about 3 percent to 5 percent when sufficient amounts of carbonate were added. It is believed that copper recovery can be increased by increasing retention time during pressure oxidation. The carbonate also reduced the iron content of the discharge liquid to well below 1 g/l and iron extraction into the discharge liquid was typically reduced to less than 1 percent. The effect of carbonate addition on zinc recovery was negligible. The carbonate addition also decreased the acid content of the liquid and decreased the emf (redox potential) of the discharge liquid.

The composition of the discharge solids for Example 6 (no carbonate addition) and Example 7 ($S_{avail}:CO_3$ ratio of 1.0) were analyzed to determine the location of the silver.

For the discharge solids of Example 6, about 79 wt. % of the silver was carried within jarosite species, primarily plumbojarosite. About 16 wt. % of the silver was associated with hematite and the remainder was associated with coarse grains of hematite/goethite, gold minerals and chalcopyrite.

For Example 7, about 85 wt. % of the silver in the discharge solids was associated with hematite. The remaining silver was associated with covellite, gold minerals and chalcopyrite. Only about 1 wt. % of the silver was associated with jarosite species.

Table 10 illustrates the results of cyanide leaching of the discharge solids with and without a lime boil treatment for Examples 1–10. This data is also illustrated in FIGS. 7 and 8.

TABLE 10

| Example | $S_{avail}:CO_3$ Ratio | Discharge Solids Extraction (%) Gold Std | Gold Lime | Silver Std | Silver Lime | NaCN (kg/mt) Std | NaCN Lime |
|---|---|---|---|---|---|---|---|
| 1 | 88 | 98.1 | 96.5 | 6.6 | 85.3 | 11.0 | 3.7 |
| 2 | 88 | 97.9 | 97.2 | 7.8 | 84.3 | 4.9 | 4.1 |
| 3 | 88 | 96.5 | 96.9 | 5.2 | 88.8 | 5.1 | 6.4 |
| 4 | 3.6 | 97.1 | 96.6 | 32.4 | 87.6 | 1.5 | 1.4 |
| 5 | 1.0 | 95.9 | 95.5 | 87.8 | 95.8 | 5.3 | 9.6 |
| 6 | 88 | 96.5 | 96.1 | 4.9 | 72.3 | 1.4 | 2.6 |
| 7 | 1.0 | 96.9 | 96.0 | 94.6 | 96.9 | 5.4 | 10.7 |
| 8 | 1.0 | 96.7 | 95.0 | 92.6 | 99.2 | 7.0 | 9.7 |
| 9 | 1.25 | 96.9 | 96.0 | 85.8 | 90.3 | 3.8 | 1.3 |
| 10 | 1.5 | 95.6 | 95.7 | 67.8 | 57.4 | 3.8 | 5.4 |

Figure 7:
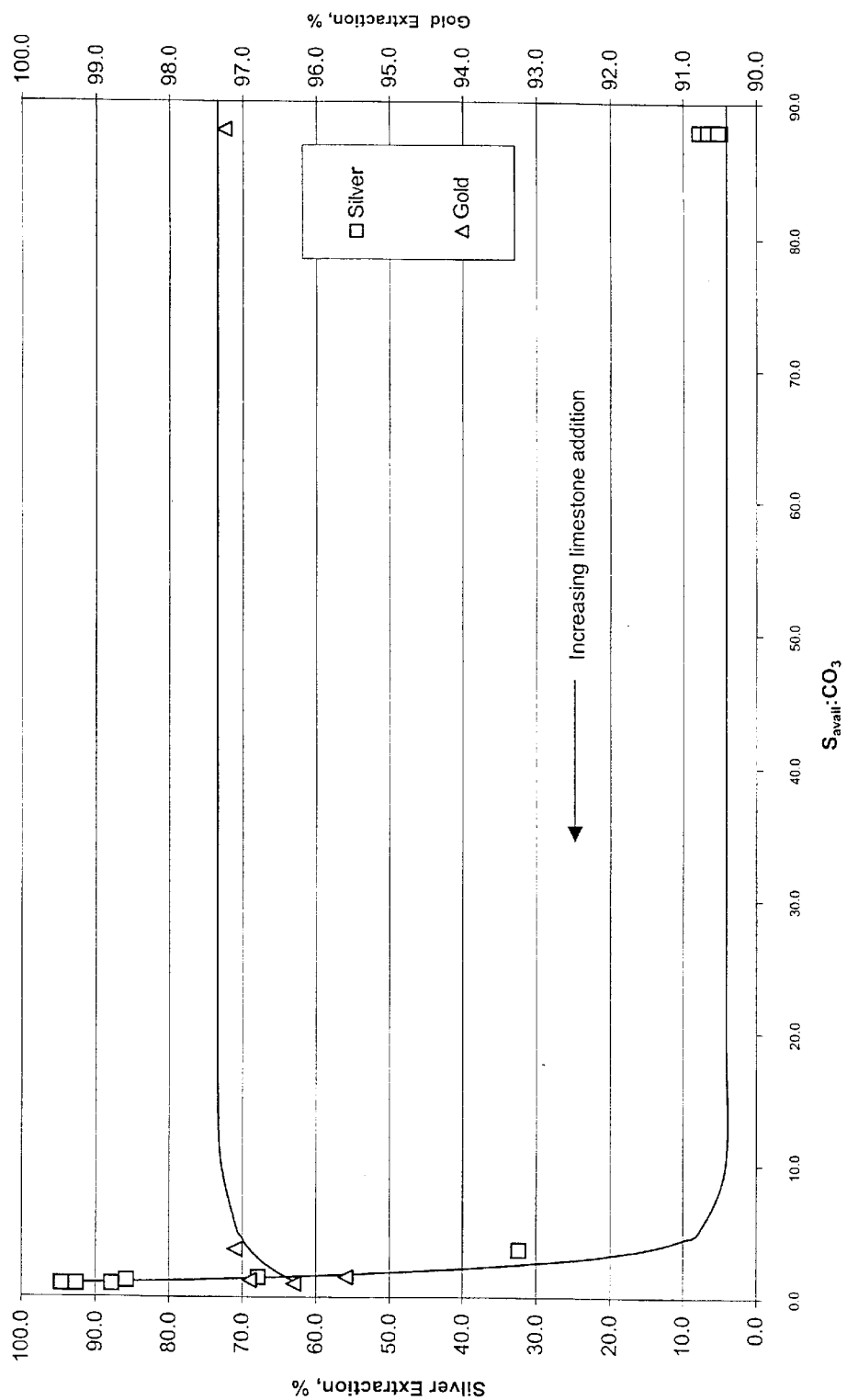
FIG. 7 illustrates the effect of adding a sulfate-binding material to the pressure oxidation step on precious metal extractions according to the present invention.
Figure 8:
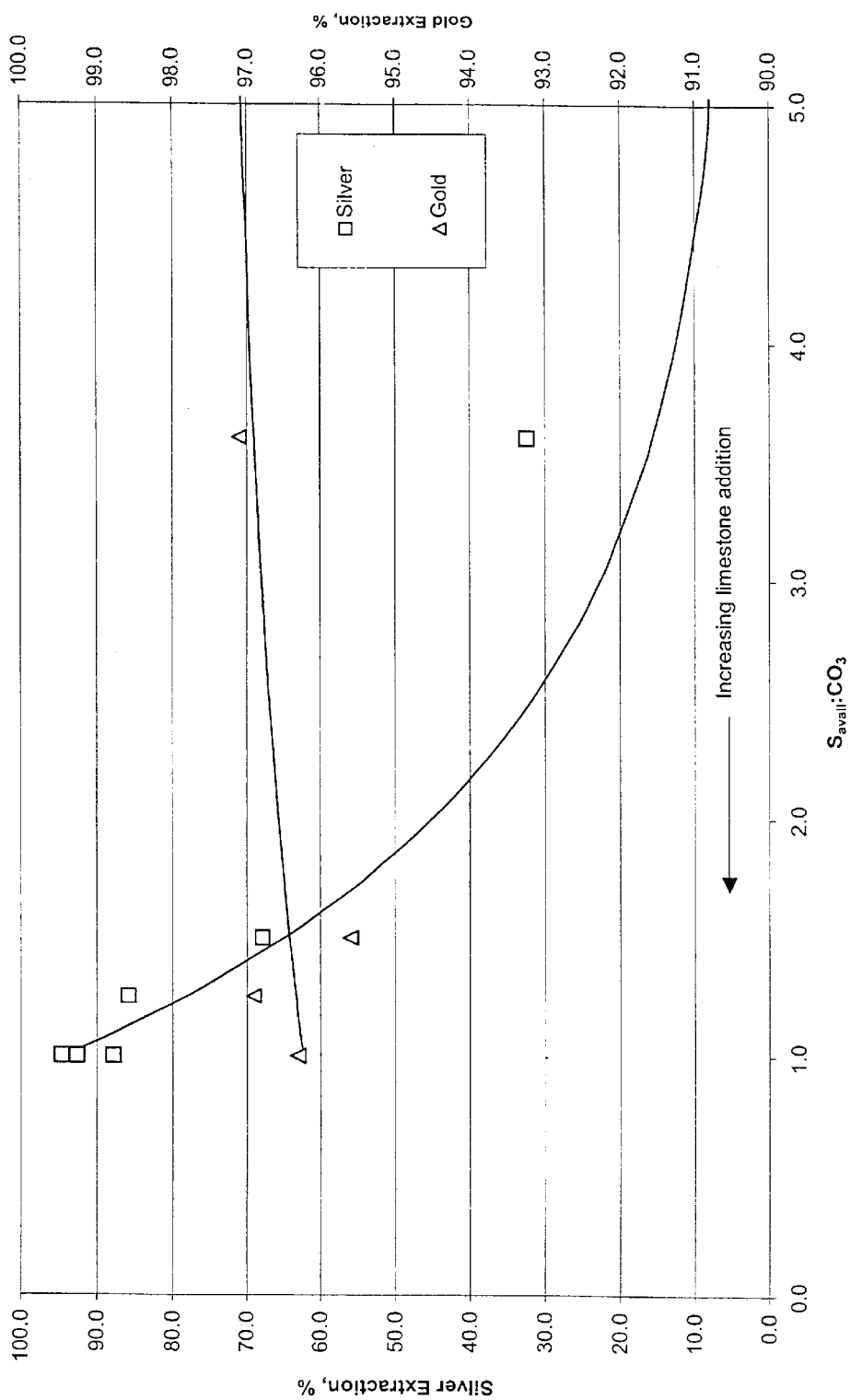
FIG. 8 illustrates the effect of adding a sulfate-binding material to the pressure oxidation step on precious metal extractions according to the present invention.

Std = standard cyanide leach
Lime = lime boil followed by standard cyanide leach Table 10 and FIGS. 7 and 8 illustrate that the addition of carbonate significantly improves silver extractions from the discharge solids. For Examples 1–3 and 6, utilizing no carbonate addition, no more than 7.8 percent of the silver in the mineral feed was recovered using a standard cyanide leach without a lime boil. The addition of a lime boil step enabled an increase in the silver recovery to about 88.8 percent.

Figure 9:
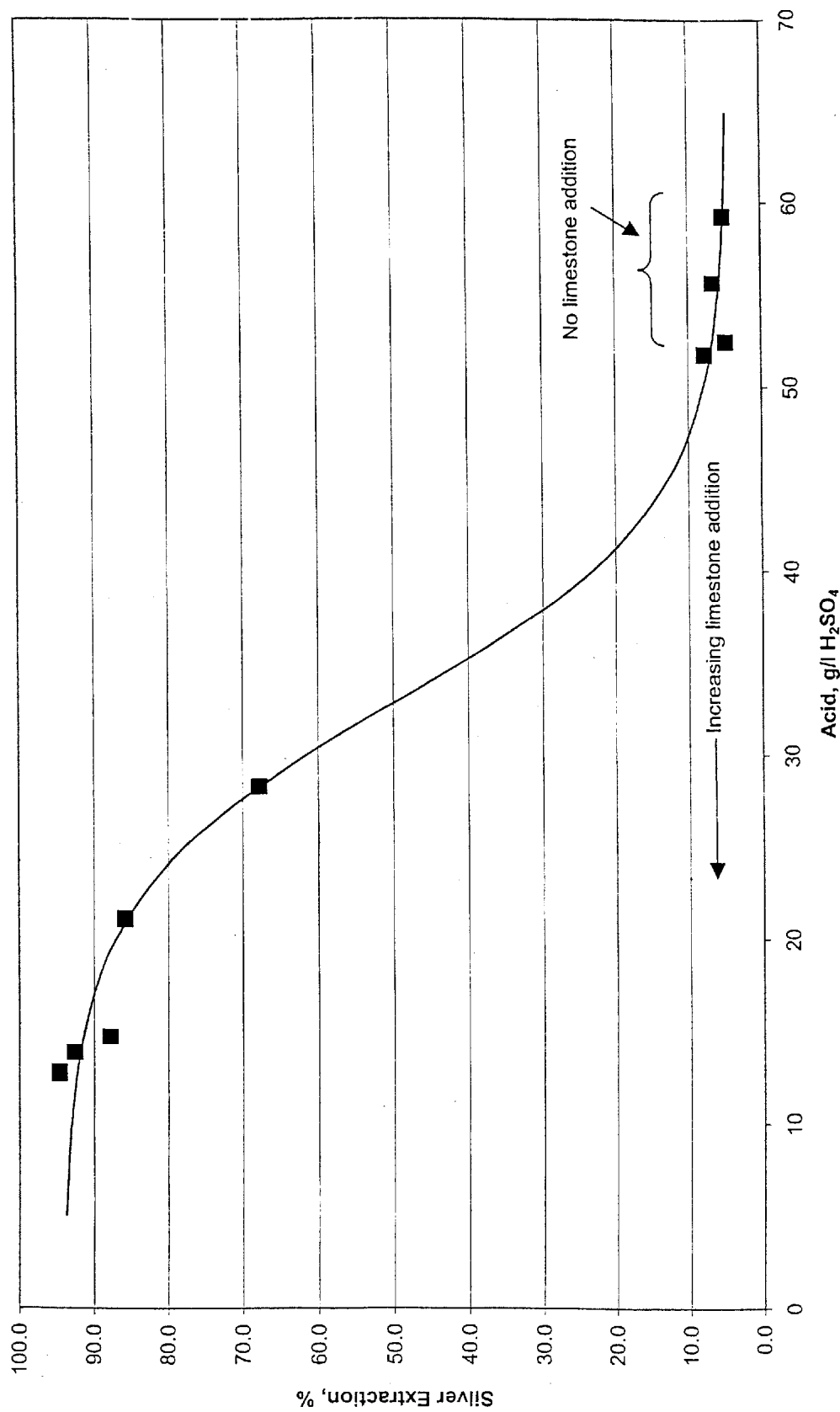
FIG. 9 illustrates the effect of acid level in the discharge liquid from the pressure oxidation step on silver extractions according to the present invention.

The addition of carbonate reduces the amount of sulfate ($SO_4^-$) that is complexed as acid. Therefore, it is possible to also show the silver extraction as a function of acid concentration. This relationship is illustrated in FIG. 9, which demonstrates the positive effect of carbonate addition on the silver extraction as measured by the free acid content. Examples 5 and 7 illustrate that by using a $S_{avail}:CO_3$ ratio of 1.0, the silver recovery in a standard cyanide leach can be increased to about 90 percent or higher without the use of a lime boil. Example 4 illustrates that small levels of carbonate (e.g., a $S_{avail}:CO_3$ ratio of 3.6) can increase silver recovery, although higher carbonate levels are required for recoveries in excess of 50 percent. Gold recovery remained in excess of 95 percent, demonstrating that the addition of carbonate did not substantially affect gold extractions from the discharge solids.

Multiple Stage Carbonate Addition

A number of mineral feeds were treated to observe the affect of staged carbonate addition using a multi-compartment autoclave. Specifically, a 4 compartment autoclave was utilized with a first portion of carbonate in the form of limestone being added with the mineral feed to the first compartment and a second portion of limestone being added to the second compartment downstream from the first compartment. The variables investigated included autoclave compartment temperature and the ratio of carbonate added in the first compartment to carbonate added in the second compartment. The test conditions are listed in Table 11. The mineral feed in each Example was PH17.

TABLE 11

| Example | Limestone Feed Ratio | $S_{avail}:CO_3$ Ratio | Temperature Split (° C.) | Retention Time (mins) | Conc. Feed Rate (g/min) | Total Limestone Feed Rate (g/min) | Conc. Feed Solids (%) |
|---|---|---|---|---|---|---|---|
| 11 | N/A | 1.0 | 220/205 | 90 | 27.8 | 17.2 | 10.9 |
| 12 | 50:50 | 1.0 | 220/205 | 90 | 30.0 | 18.5 | 11.9 |
| 13 | 69:31 | 1.36 | 220/205 | 90 | 28.3 | 17.5 | 10.2 |
| 14 | 75:25 | 1.0 | 220/205 | 90 | 27.8 | 17.2 | 10.9 |

The limestone feed ratio is the ratio of limestone added to compartment 1 (in the feed slurry or separately) to the limestone added to compartment 2. No limestone addition split was used for Example 11. The composition of the discharge liquid and the extraction results are illustrated in Table 12.

TABLE 12

| Example | Discharge Liquid Fe (g/l) | $H_2SO_4$ (g/l) | emf (mV) | Extraction Cu | Fe | Zn |
|---|---|---|---|---|---|---|
| 11 | 0.174 | 12.6 | 425 | 93.2 | 0.5 | 97.5 |
| 12 | 0.218 | 14.3 | 450 | 95.5 | 0.7 | 98.3 |
| 13 | 0.273 | 26.3 | 485 | 97.6 | 0.7 | 98.9 |
| 14 | 0.123 | 13.2 | 417 | 95.3 | 0.6 | 98.3 |

The manner of adding the carbonate affects the acid level in the first compartment and thereby affects the overall rate and extent of copper extraction. Comparing Examples 11 and 12, splitting the carbonate addition between the first and second compartments increased the copper recovery by 2.3% as compared to adding all of the carbonate in the first compartment. Zinc recovery was not substantially affected.

Table 13 illustrates the results of precious metals recovery from the discharge solids.

TABLE 13

| Example | Discharge Solids Extraction (%) | | | | NaCN (kg/mt) | |
|---------|------|------|------|------|------|------|
| | Gold | | Silver | | | |
| | Std | Lime | Std | Lime | Std | Lime |
| 11 | 97.0 | 94.7 | 94.5 | 96.4 | 12.8 | 19.8 |
| 12 | 96.4 | 95.8 | 91.8 | 97.4 | 10.2 | 22.8 |
| 13 | 93.7 | — | 70.0 | — | 6.4 | 23.6 |
| 14 | 96.2 | — | 94.6 | — | 17.2 | 29.2 |

The post-autoclave gold extractions were relatively unaffected by staged carbonate addition at a $S_{avail}:CO_3$ ratio of 1.0. The post-autoclave silver extractions obtained using a $S_{avail}:CO_3$ ratio of 1.0 averaged 94.2 percent. Comparing Examples 11, 12 and 13, the extraction of silver was best when all of the limestone was added to Compartment 1, when 75% of the limestone was added to Compartment 1. Splitting the limestone addition 50:50 had a minor affect on silver recovery. Therefore, to maximize recovery of silver and copper, staged addition of carbonate can be used wherein the portion of carbonate added with the feed slurry is greater than the portion added downstream.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A method for processing a mineral feed comprising iron, sulfide sulfur and silver to facilitate recovery of silver, comprising the steps of:
   (a) pressure oxidizing an aqueous feed slurry comprising said mineral feed wherein at least about 70 percent of sulfide sulfur in said mineral feed is converted to sulfate sulfur;
   (b) recovering from said pressure oxidizing step an aqueous discharge slurry comprising discharge solids and aqueous discharge liquid, said discharge solids comprising at least a portion of said silver and at least apportion of said iron from said mineral feed; and
   (c) leaching at least a portion of said discharge solids with a leach solution to dissolve into the leach solution at least a portion of said silver from said discharge solids;
   wherein the concentration of dissolved iron in said discharge slurry is not greater than 1 gram of dissolved iron per liter of aqueous discharge liquid.

2. A method as recited in claim 1, wherein said method is in the absence of a jarosite destruction step between said pressure oxidizing step and said leaching step.

3. A method as recited in claim 2, comprising the step of washing said discharge solids with an aqueous wash liquid before said leaching step.

4. A method as recited in claim 3, further comprising the step of neutralizing said discharge solids after said washing step and before said leaching step.

5. A method as recited in claim 4, wherein said leach solution is a cyanide leach solution and said leaching step is conducted at a pH of at least about pH 9.5.

6. A method as recited in claim 2, wherein during said leaching step at least 50 wt. % of said silver from said mineral feed is dissolved into said leach solution from said discharge solids.

7. A method as recited in claim 2, wherein during said leaching step at least 75 wt. % of said silver from said mineral feed is dissolved into said leach solution from said discharge solids.

8. A method as recited in claim 2, wherein during said leaching step at least 85 wt. % of said silver from said mineral feed is dissolved into said leach solution from said discharge solids.

9. A method as recited in claim 2, wherein said mineral feed comprises gold and at least 80 wt. % of said gold is dissolved into said leach solution from said discharge solids.

10. A method as recited in claim 1, wherein no more than 50 wt. % of silver in said discharge solids is associated with jarosite species.

11. A method as recited in claim 1, wherein no more than 20 wt. % of silver in said discharge solids is associated with jarosite species.

12. A method as recited in claim 2, wherein no more than 10 wt. % of silver in said discharge solids is associated with jarosite species.

13. A method as recited in claim 1, wherein the concentration of dissolved iron in said aqueous discharge liquid is not greater than 0.5 gram of dissolved iron per liter of aqueous discharge liquid.

14. A method as recited in claim 1, wherein the concentration of dissolved iron in said aqueous discharge liquid is not greater than 0.3 gram of dissolved iron per liter of aqueous discharge liquid.

15. A method as recited in claim 1, wherein said discharge solids comprise at least 75 wt. % of said silver contained in said mineral feed.

16. A method as recited in claim 1, wherein no greater than 25 wt. % of the iron in said discharge solids is in sulfate-containing compounds.

17. A method as recited in claim 1, wherein no greater than 10 wt. % of the iron in said discharge solids is in sulfate-containing compounds.

18. A method as recited in claim 1, wherein at least 75 wt. % of the iron in said discharge solids is in hematite.

19. A method as recited in claim 1, wherein at least 90 wt. % of the iron in said discharge solids is in hematite.

20. A method as recited in claim 1, wherein the free acid level in said discharge slurry is maintained in a range of from 5 to 30 grams of free acid per liter of aqueous discharge liquid.

21. A method as recited in claim 1, wherein the free acid level in said discharge slurry is maintained in a range of from 12 to 22 grams of free acid per liter of aqueous discharge liquid.

22. A method as recited in claim 1, wherein said pressure oxidizing step is conducted in a single compartment autoclave.

23. A method as recited in claim 1, wherein said pressure oxidizing step is conducted in a reactor comprising a plurality of compartments arranged in series.

24. A method as recited in claim 1, wherein said pressure oxidizing step is conducted in a plurality of autoclave reactors arranged in series.

25. A method as recited in claim 1, further comprising the step of adding a sulfate-binding material to said pressure oxidizing step.

26. A method as recited in claim 1, further comprising the step of adding a sulfate-binding material to said pressure oxidizing step by adding said sulfate-binding material to said aqueous feed slurry.

27. A method as recited in claim 1, further comprising the step of adding a sulfate-binding material to said pressure oxidizing step separate from said aqueous feed slurry.

28. A method as recited in claim 1, further comprising the step of adding a sulfate-binding material to said pressure oxidizing step by adding a first portion of said sulfate-binding material with said aqueous feed slurry and adding a second portion of said sulfate-binding material separate from said aqueous feed slurry.

29. A method as recited in claim 1, further comprising the step of adding a sulfate-binding material to said pressure oxidizing step, said sulfate-binding material being in the form of a compound selected from the group consisting of calcium compounds, sodium compounds, potassium compounds, magnesium compounds and combinations thereof.

30. A method as recited in claim 1, further comprising the step of adding a sulfate-binding material to said pressure oxidizing step, said sulfate-binding material being in the form of a compound selected from the group consisting of calcium carbonate, calcium oxide, calcium hydroxide and combinations thereof.

31. A method as recited in claim 1, further comprising the step of adding a sulfate-binding material to said pressure oxidizing step, wherein said sulfate-binding material is in the form of a carbonate compound.

32. A method as recited in claim 1, wherein said pressure oxidizing step comprises the steps of pressure oxidizing said aqueous feed slurry in an autoclave and monitoring the value of at least one property of contents of said slurry within said autoclave, analyzing the value, and based on the analyzing, adjusting a feed rate to the reactor of at least one of a sulfate-binding material and said mineral feed.

33. A method as recited in claim 32, wherein said at least one property is temperature.

34. A method as recited in claim 32, wherein said at least one property is pressure.

35. A method as recited in claim 1, further comprising the step of monitoring the value of at least one property of said discharge slurry, analyzing the value and based on the analyzing, adjusting a process variable selected from mineral feed feed rate, sulfate-binding material feed rate and temperature.

36. A method as recited in claim 35, wherein said at least one property is iron concentration in said discharge slurry.

37. A method as recited in claim 35, wherein said at least one property is emf.

38. A method as recited in claim 35, wherein said at least one property is free acid level.

39. A method as recited in claim 1, further comprising the step of monitoring the value of at least one property of a vent gas from said pressure oxidizing step, analyzing the value and based on the analyzing, adjusting a process variable selected from mineral feed feed rate, sulfate-binding material feed rate and temperature.

40. A method as recited in claim 39, wherein said property is the concentration of a gas selected from the group consisting of oxygen and carbon dioxide.

41. A method as recited in claim 1, wherein during said pressure oxidizing step at least 80 percent of sulfide sulfur in said mineral feed is converted to sulfate sulfur.

42. A method as recited in claim 1, wherein said pressure oxidizing step is conducted at a temperature of at least 160° C.

43. A method as recited in claim 1, wherein said pressure oxidizing step is conducted at a temperature of at least 190° C.

44. A method as recited in claim 1, wherein said pressure oxidizing step is conducted at a temperature of at least 210° C.

45. A method as recited in claim 1, wherein said pressure oxidizing step is conducted at a temperature of at least 220° C.

46. A method as recited in claim 1, wherein said mineral feed comprises a non-ferrous base metal selected from the group consisting of copper, zinc, nickel, cobalt and mixtures thereof and said pressure oxidizing step comprises dissolving at least 90 percent of said non-ferrous base metal in said discharge liquid.

47. A method as recited in claim 1, comprising after said pressure oxidizing step and before said leaching step, separating said discharge solids from said aqueous discharge liquid to produce a solid product comprising at least a portion of said discharge solids and a liquid product comprising at least a portion of said aqueous discharge liquid.

48. A method as recited in claim 47, wherein said separating step comprises the step of washing said discharge solids with an aqueous wash liquid to form an effluent wash liquid and adding said aqueous discharge liquid to said effluent wash liquid collected from said washing step.

49. A method as recited in claim 48, wherein after said washing step, at least a portion of said base-metal is recovered from said liquid product by solvent extraction.

50. A method as recited in claim 49, comprising the step of contacting said liquid product with a neutralizing agent comprising a calcium-containing component selected from the group consisting of calcium carbonate, calcium oxide, calcium hydroxide and combinations thereof.

51. A method as recited in claim 1, wherein said mineral feed comprises at least one copper-containing sulfide mineral selected from the group consisting of chalcocite, chalcopyrite, bornite, covellite, digenite, enargite and tetrahedrite.

52. A method for the treatment of a mineral feed comprising iron, sulfide sulfur and silver, comprising the steps of:
   (a) pressure oxidizing an aqueous feed slurry comprising said mineral feed at a temperature of at least about 160° C.; and
   (b) withdrawing a discharge slurry from said pressure oxidation step comprising discharge solids and a discharge liquid,
      wherein said pressure oxidizing step is conducted in the presence of a sufficient concentration of a sulfate-binding material comprising a compound selected from the group consisting of carbonates, hydroxides and oxides of metals selected from the group consisting of calcium, sodium, potassium and magnesium such that at least about 75 percent of said silver contained in said mineral feed is discharged in said discharge solids and not greater than 25 wt. % of the silver contained in said discharge solids is associated with jarosite species.

53. A method as recited in claim 52, wherein said sulfate-binding material is in the form of a carbonate.

54. A method as recited in claim 52, wherein said sulfate-binding material is in the form of calcium carbonate.

55. A method as recited in claim 52, wherein said sulfate-binding material is in the form of a compound selected from the group consisting of limestone, dolomite and mixtures thereof.

56. A method as recited in claim 52, wherein at least a portion of said sulfate-binding material is mixed with said mineral feed slurry before said pressure oxidizing step.

57. A method as recited in claim 52, wherein at least a portion of said sulfate-binding material is added to said pressure oxidizing step separate from said mineral feed slurry.

58. A method as recited in claim 52, wherein said pressure oxidizing step is conducted at a temperature of at least about 190° C.

59. A method as recited in claim 52, wherein said pressure oxidizing step is conducted at a temperature of at least about 210° C.

60. A method as recited in claim 52, wherein at least about 90 wt. % of said silver contained in said mineral feed is in said discharge solids.

61. A method as recited in claim 52, wherein not greater than about 10 wt. % of the silver contained in said discharge solids is associated with jarosite species.

62. A method as recited in claim 52, wherein said discharge liquid comprises not greater than one gram dissolved iron per liter of discharge liquid.

63. A method as recited in claim 52, wherein the ratio of available sulfur to carbonate during said pressure oxidizing step is not greater than 2.0:1.

64. A method as recited in claim 52, wherein said mineral feed comprises at least about 50 grams silver per metric ton of mineral feed.

65. A method for recovering silver from a mineral feed comprising sulfide sulfur, iron and silver, comprising the steps of:
 (a) pressure oxidizing an aqueous slurry comprising said mineral feed in the presence of oxygen gas to convert at least 80 percent of the sulfide sulfur in the mineral feed to sulfate sulfur, said pressure oxidizing step being conducted at a temperature of at least 210° C.;
 (b) recovering from said pressure oxidizing step a discharge solids comprising at least a portion of said iron and a portion of said silver from the mineral feed; and
 (c) leaching at least a portion of said silver from discharge solids recovered from said pressure oxidizing step;
  wherein not greater than 25 wt. % of the iron in said discharge solids is contained in sulfate-containing compounds.

66. A method as recited in claim 65, further comprising the step of adding a carbonate compound to said feed slurry.

67. A method as recited in claim 65, wherein said carbonate compound comprises calcium carbonate.

68. A method as recited in claim 65, wherein the ratio of available sulfur to carbonate during said pressure oxidizing step is not greater than 2.0:1.

69. A method as recited in claim 65, wherein not greater than 10 wt. % of the iron in said discharge solids is contained in sulfate-containing compounds.

70. A methods as recited in claim 65, wherein not greater than 20 wt. % of silver contained in said discharge solids is associated with jarosite species.

71. A method for recovering silver from a mineral feed comprising silver, sulfide sulfur and iron, comprising the steps of:
 (a) pressure oxidizing said mineral feed in a reactor at a temperature of at least 190° C. to oxidize at least 90 percent of the sulfide sulfur in said mineral feed to sulfate sulfur and to produce silver-containing discharge solids; and
 (b) leaching at least a portion of said discharge solids with a leach solution to dissolve at least a portion of the silver into said leach solution;
  wherein said pressure oxidizing step comprises:
   (i) feeding an aqueous feed slurry comprising said mineral feed to said reactor;
   (ii) feeding an sulfate-binding material to said reactor separate from said feed slurry; and
   (iii) withdrawing from said reactor an aqueous discharge slurry comprising said discharge solids.

72. A method as recited in claim 71, wherein said sulfate-binding material is in the form of a carbonate compound.

73. A method as recited in claim 71, wherein said sulfate-binding material in the form of calcium carbonate.

74. A method as recited in claim 71, wherein said pressure oxidizing step is conducted at a temperature of at least about 210° C.

75. A method for recovering silver and a non-ferrous base metal from a mineral feed comprising sulfide sulfur, iron, silver and a non-ferrous base metal, with at least a portion of said non-ferrous base metal being contained in one or more sulfide minerals, comprising the steps of:
 (a) pressure oxidizing said mineral feed, the pressure oxidizing comprising:
  (i) feeding an aqueous feed slurry comprising said mineral feed to a reactor;
  (ii) feeding oxygen gas to the reactor;
  (ii) in the reactor, oxidizing at least 90 percent of the sulfide sulfur in the mineral feed to sulfate sulfur;
  (iii) dissolving at least 90 wt. % of the non-ferrous base metal from the mineral feed into aqueous liquid in the reactor;
  (iv) discharging from the reactor an aqueous discharge slurry comprising discharge solids and an aqueous discharge liquid, the discharge solids comprising at least 85 wt. % of the silver from the mineral feed and the aqueous discharge liquid having dissolved therein at least 90 wt. % of the non-ferrous base metal from the mineral feed;
 (b) after said pressure oxidizing step, separating the discharge solids from the aqueous discharge liquid;
 (c) after said separating step, processing the aqueous discharge liquid to remove at least a portion of the non-ferrous base metal from the aqueous discharge liquid and separately processing the discharge solids to remove at least a portion of the silver from the discharge solids;
  wherein, during said pressure oxidizing, the reactor is maintained at a temperature of at least 190° C. and dissolved iron in the discharge slurry is maintained at a concentration of not greater than 1 gram of dissolved iron per liter of the discharge liquid.

\* \* \* \* \*